United States Patent Office 2,716,589
Patented Aug. 30, 1955

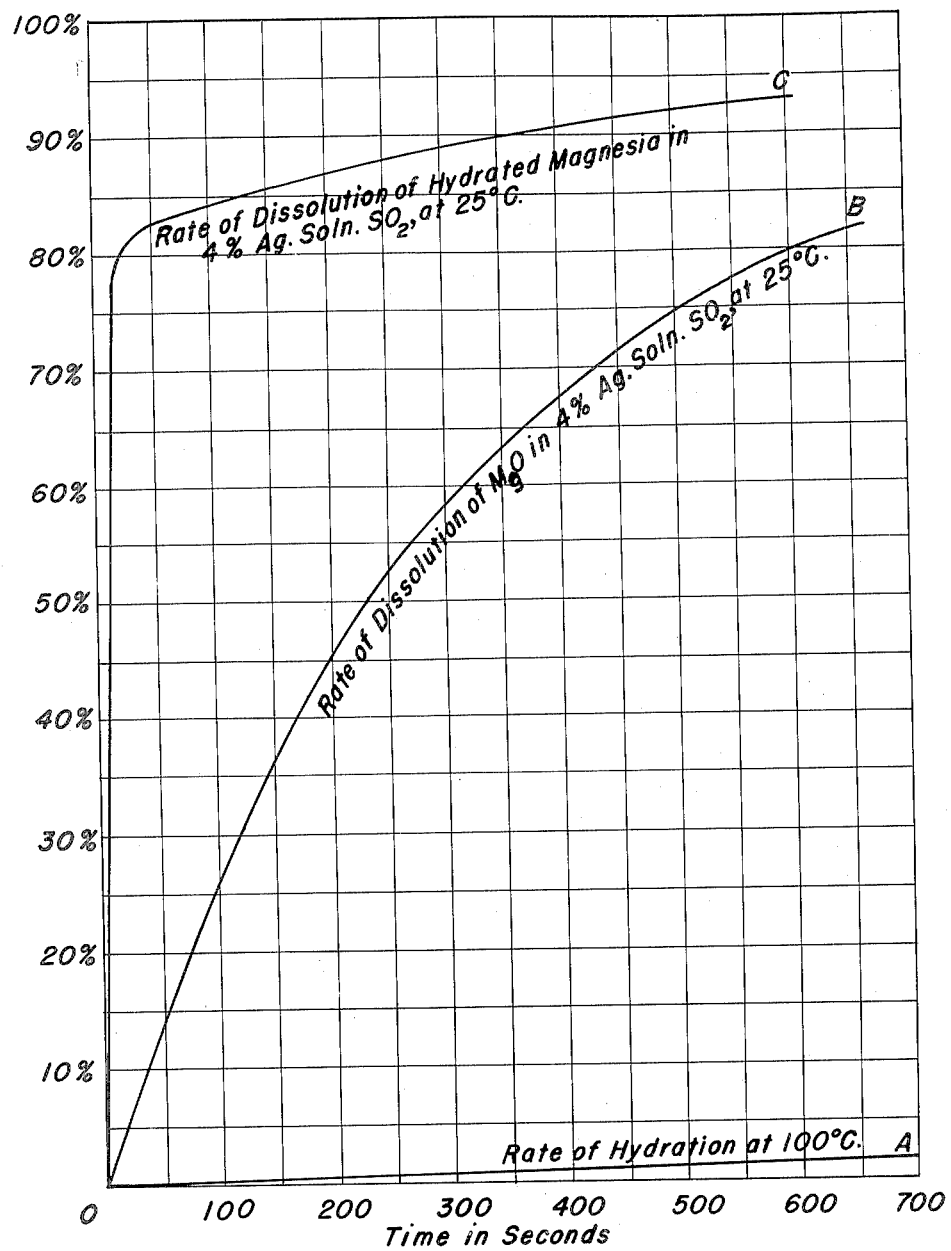

2,716,589

PROCESS OF RE-FORMING MAGNESIUM BISULFITE SOLUTION

Alva C. Byrns, Concord, Calif., assignor to The Kaiser Aluminum & Chemical Corporation, Oakland, Calif., a corporation of Delaware Application April 20, 1951, Serial No. 221,993

5 Claims. (Cl. 23—131)

This invention relates to the production of cellulose pulp by the digestion of cellulosic fibrous material, such as wood, with magnesium bisulfite; and more particularly, to the processes of re-forming the magnesium bisulfite digestion liquor.

It has been recognized in the pulp industry for some time that it is advantageous to employ magnesium bisulfite instead of the calcium bisulfite which had been used in the earlier art, because both the magnesia and the sulfur dioxide can be recovered and re-used in the digestion process, obviating many problems of waste disposal and having other advantages. In this process, as heretofore practiced, magnesia is reacted in water slurry with sulfur dioxide, to form magnesium bisulfite. The latter reacts in the cellulosic fiber or wood digestion step to form magnesium lignin sulfonate; and this, in turn, is utilized in the process by being burned in the furnaces to provide, on the one hand, heat required in the operations, and, on the other hand, useful products of combustion. In such burning, magnesia is recovered as an ash, and sulfur dioxide, which goes off with the flue gases, is re-absorbed in a magnesia-water slurry to form new sulfite liquor, or magnesium bisulfite, for use in the digestion step.

It has been the practice, heretofore, to react magnesia, magnesium oxide, suspended in water, as a slurry, with sulfur dioxide to form the magnesium bisulfite, and for this purpose the art has required active and finely divided magnesia. This has been disadvantageous for several reasons. Among these reasons it may be mentioned that, in employing an active, finely divided magnesia obtained from commercial sources, the product requires considerable labor for handling because it "hangs up" and does not flow freely from storage bins, or the like. Further disadvantages have been that large amounts of heat are developed upon reacting such magnesia slurries with sulfur dioxide, necessitating considerable cooling capacity, and that the pumping of the magnesia ash slurry has resulted in excessive erosion and wear of the equipment. Also, in order to recover magnesia ash in the active, or caustic, state from the burning of the magnesium lignin sulfonate liquor, it is essential to operate the furnaces at considerably less than the maximum efficiency.

It is among the objects of this invention to provide a method for utilizing magnesia of any state of activity as make-up and in the reaction with $SO_2$ to form magnesium bisulfite. It is also an object to provide a more rapid reaction in the formation of the magnesium bisulfite; and it is a still further object to provide a method of forming magnesium bisulfite wherein less amounts of heat of reaction are developed and, therefore, less cooling capacity for such liquid is required.

According to the present invention it has now been found that the above disadvantages are avoided and the desired objects are attained by employing magnesium hydroxide as make-up for lost magnesia values, and the magnesium hydroxide can be formed by hydrating the magnesia employed prior to reaction as with sulfur dioxide. In addition, the magnesia ash from the furnaces is advantageously hydrated before reaction. Magnesium hydroxide is employed as make-up, to replace the magnesium values lost in the process, and is admixed in forming the sulfite liquor, or in the neutralization of the liquor resulting from pulp digestion, or in both stages. The magnesia which is recovered in the burning of the liquor can be hydrated, and thereafter be added in the neutralization step and can also be converted to magnesium bisulfite by reaction with $SO_2$ gas, in the economic operation of this process. However, due to the low content of insoluble impurities of the recycle magnesia, it is ordinarily employed dry or as a dense slurry in water, as will be further explained below.

Some make-up magnesia values are usually required to make up the amounts of magnesia lost, as through the stack gases from the burning liquors, or otherwise, in normal operation of the process, and for this purpose magnesium hydroxide is added, as stated. Such $Mg(OH)_2$, for example, can be obtained by reacting magnesium salt solutions such as sea water, bitterns or brines, with an alkali such as lime, calcined dolomite, caustic soda, caustic potash or the like to precipitate $Mg(OH)_2$, and washing and filtering to obtain a magnesium hydroxide filter cake. This cake can be used in the present process, or it can be dried prior to use, or it can be calcined to MgO. Magnesium oxide or hydroxide from any source can be employed, however, provided it contains at least 95.0% MgO, preferably over 96.0% MgO, and not over 1.5% CaO, all on the fired or ignited basis. The magnesia preferably contains less than 1.0% CaO, on the ignited basis. Magnesium oxide, where employed as make-up, is hydrated prior to introduction into the reaction system. It may be advantageous economically, in order to decrease shipping costs, to calcine $Mg(OH)_2$ to MgO at the site of production and to ship the material as the oxide, rehydrating at the site of use.

Rehydration proceeds rapidly when employing magnesia of the purity described above. It is believed that this is because the magnesia crystals do not have film coatings of insoluble glasses, such as are formed by the silica and other constituents present in magnesia of lower MgO and correspondingly higher impurity content. Whatever the mechanism may be, magnesia containing at least 95.0% MgO rehydrates readily upon boiling with water and it is not necessary to employ it in finely divided state. In other words, the magnesia can be used as it comes from the calcining zone, that is, without grinding or the so-called "kiln-run" material. Likewise, such magnesia can have been calcined or fired to the hard-burned state, that is, to substantially zero ignition loss.

It is essential that the lime content be not over 1.5%, because higher amounts of lime cause very undesirable side reactions which make the continuous, recycle process too expensive and uneconomical. As one disadvantage of higher lime content, upon reaction with $SO_2$, CaO preferentially forms the substantially insoluble calcium monosulfite which is removed by filtration or otherwise from the circulating liquors, resulting in excessive loss of $SO_2$ from the system. As another disadvantage, any lime which is converted to the soluble calcium bisulfite goes to the digestion zone and there forms calcium lignin sulfonate, resulting in excessive amounts of scale, necessitating cleaning, shut-down, etc., and also resulting in loss of $SO_2$ and of the organic values useful as fuel.

Advantageously, hydration of the magnesia is effected also by introducing live steam into the slurry of magnesia in water. Preferably, the material is also agitated during hydration. Suitably, the agitation is effected by slowly stirring. It is postulated that the special effectiveness of hydration in the recycling of magnesia recovered as ash is due to the circumstance that the ash magnesia is in the form of tiny cenospheres, each of which apparently consists of an outer shell, containing agglomerates of magnesia crystals enclosing large numbers of voids, or, in other words, relatively large amounts of entrapped air or gas. The aggregates, or cenospheres, are predominantly larger than will pass through a screen having 325 meshes to the linear inch (325 mesh, U. S. Bureau of Standards); and are of very low bulk density, usually of from about 3 to about 8 pounds per cubic foot. The magnesia particles contained in the aggregates are well-crystallized periclase. When the material is hydrated these cenospheres are apparently disintegrated and the air or gas liberated. It is believed that the excessive wear on pumps and other equipment previously experienced in transferring water slurries of the unhydrated magnesia is due to the cavitation effect caused by liberation of air from the cenospheres during the flow of the cold magnesium oxide slurries of the prior art. Whatever may be the correct theory of operation, it is observed that wear of equipment is not excessive when pumping and transferring slurries of hydrated magnesia, or magnesium hydroxide.

It is a further feature of the process of this invention that the formation of magnesium bisulfite is extremely rapid and there is less heat of reaction evolved. The reaction rate is about 10 to 20 times that of the earlier process of reacting magnesia and $SO_2$. The mechanism of this reaction is evidently different from the reaction between MgO and $SO_2$, and is shown by the fact that this effect is greater than merely combining the rate of hydration and the rate of reaction of magnesium oxide with $SO_2$, as is demonstrated by the examples, the results of which are shown graphically in the annexed drawing. In the drawing, curve A represents the rate of hydration of a portion of hard-burned magnesia having an iodine number of less than 1.0 and containing 1.41% $SiO_2$, 0.32% $Fe_2O_3$, 0.10% $Al_2O_3$, 1.12% CaO, 1.00% $SO_3$, 0.25% $B_2O_3$, and 95.54% MgO. Curve B represents the rate of reaction of another portion of the same magnesia when reacted with $SO_2$. Curve C represents the rate of reaction of another portion of the same magnesia after it has been hydrated by boiling for one hour in mixture with an excess of water. The tests are carried out as follows. To determine hydration rate, a weighed portion of the magnesia in finely divided state (substantially entirely passing 200 mesh and predominantly passing 325 mesh U. S. Bureau of Standards) is poured rapidly into a vigorously agitated beaker of boiling water. At each time interval desired, a volume of slurry is pipetted out and rapidly discharged into a Büchner funnel. When the last trace of hot water has passed through the filter cake, the cake is flooded with cold water and the time from the original immersion to cooling is taken as the time of hydration. The filter cake is next washed with acetone and dried at 110° C. for one hour. The percentage hydrated is calculated by dividing ignition loss by 0.3088, and the results are plotted to give curve A.

To determine rate of reaction of magnesia with $SO_2$, in this example, 0.25 g. portions of the finely divided magnesia are mixed with 12.5 cc. portions of water at 25° C. Each mixture is thoroughly stirred for one minute and there are then added thereto, with continuous rapid stirring, 12.5 cc. of an 8% solution of $SO_2$ in water, at 25° C., each mixture thereby containing 4% $SO_2$. Each of these mixes is stirred for the desired period of time and is then poured into a 7 cm. Büchner funnel and filtered as rapidly as possible, using high vacuum. As soon as the last trace of solution has passed through the filter, it is flooded with washing water, and the time from addition of $SO_2$ solution to the washing step is recorded as the reaction time. The difference between the amount of solids remaining on the filter, after ignition at 1000° C., and the starting solids is calculated as percentage of MgO dissolved. These results are plotted as curve B.

To determine the reaction of magnesium hydroxide, or hydrated magnesia, an amount of the same hard-burned magnesia is hydrated by boiling with an excess of water for one hour. Portions of the hydrated material are treated with $SO_2$ solution as in B, above, and the amounts reacted at successive time intervals are determined, and plotted to give curve C. It can be seen that the reactivity of the hydrated material is beyond what would be expected from a knowledge of the rate of hydration and of the rate of reaction of magnesia with $SO_2$.

Similar advantages can be obtained by hydrating light-burned, or active, magnesia and the recycled magnesia ash. In each case, hydration prior to reaction with $SO_2$ reduces the time of reaction. For instance, a 0.25 gm. sample of unhydrated light-burned magnesia having an ignition loss of 2.25%, when slurried with cold water, is only 66.5% reacted after 20.2 seconds; whereas, after hydration of another 0.25 gm. sample thereof by boiling with water, 95.74% is reacted after treatment for 20.2 seconds with a 4% solution of $SO_2$ in water. An amount of recycle magnesia ash slurried with cold water, in similar tests, is found to be 24.8% reacted after treatment with 4% $SO_2$ solution for 11.5 seconds and 44.5% reacted after 29 seconds; whereas another sample of this material, after hydration by boiling with water, is 97.9% reacted after 14.5 seconds' treatment. However, it is frequently more desirable for general economy of operation in plant practice, to sulfite the recycle ash after merely slurrying the ash with water. Make-up is added as magnesium hydroxide at this step.

The mode of practicing the present invention will be illustrated by the following description of a pulping operation in which it is employed.

An amount of wood chips or other cellulosic fibrous material is cooked in a digester with a cooking liquor which is a relatively pure solution of magnesium bisulfite in water, containing excess $SO_2$, and the cooked material is then filtered to separately recover the pulp and acid waste liquor. The pulp is washed with hot water and the wash filtrate recovered can, preferably, be later employed in slurrying and hydrating the recycled or make-up MgO. The waste liquor, containing from 12% to 14% solids, is quite acid, that is, has a pH value of about 2.5 to 3.0, and contains loosely combined $SO_2$ which is liberated during evaporation, resulting in loss of $SO_2$ and also in corrosion of equipment. Therefore, this liquor is neutralized by the addition of recycled magnesia ash recovered from the burning of the concentrated liquors and, if desired, a minor portion of make-up $Mg(OH)_2$. For this purpose, magnesium hydroxide can be added in dry state or as a slurry in water. $Mg(OH)_2$ is added to bring the pH of the liquor to about neutrality, e. g. pH 7 to 8.

The neutralized liquor is now conducted to a series of conventional multiple-effect evaporators where it is concentrated, for example, to from 50% to 60% solids. The concentrated liquor is fed into a furnace, or recovery boiler, suitably by spraying, where the organic constituents of the liquor are burned, supplying heat to the boiler for production of steam. The principal constituents of the dissolved solids are magnesium lignosulfonate, carbohydrates, proteins, resin and fat, the organic components of which burn to produce gaseous products of combustion, the magnesium values yield the very small magnesia cenospheres described hereinabove, and the sulfur component forms $SO_2$ and goes off with the gases. The products of combustion go off through a stack system where the finely divided MgO is recovered in multiclones or other suitable collecting devices. The stack gases, freed of most of the MgO dust, are then suitably passed through a scrubber where the gases are cooled and further dust is removed. The scrubbed gases, which contain less than 1% of $SO_2$, are then introduced into the base of an absorption tower.

The finely divided magnesia recovered from the stack gases is mixed with water or, preferably, with the washer filtrate described above, to form a slurry or suspension of the finely divided MgO in water and some Mg(OH)$_2$. If desired, the slurry or suspension can be heated, whereupon hydration takes place quite readily because the ash magnesia has a very high specific surface and is of relatively high purity. The impurities which are present in these cenospheres derive largely from water-soluble salts or other constituents of the liquors, and apparently form a substantially water-soluble film on the surfaces of the magnesia recovered from the burning of the liquors. Because of such characteristics, the magnesia hydrates very rapidly even though it has been burned to the periclase state. Make-up magnesium hydroxide is added to the magnesia slurry in this step to compensate for the above-mentioned losses of MgO values occurring in the system during normal operation of the process. The amount of magnesium hydroxide added, therefore, is that sufficient to replace losses as determined by control analyses. In economic operation the make-up added is ordinarily from about 5 to about 25 pounds, preferably not over about 10 pounds, of magnesium hydroxide, calculated as MgO, for each 100 pounds total MgO in the system, or circulating liquids or suspensions. The magnesia and Mg(OH)$_2$ slurry or suspension, or alternatively, the magnesium hydroxide slurry, is introduced into the top of the absorption tower and trickles downwardly over suitable filling material. The SO$_2$-containing gases flow upwardly counter-current to the slurry and the SO$_2$ is absorbed therein, reacting very rapidly with the MgO and/or Mg(OH)$_2$ to form magnesium sulfite and bisulfite. For better efficiency two or more absorption towers are usually employed in series. The liquor leaving the absorption towers comprises a water solution containing magnesium bisulfite and some suspended solids including carbon from the stack gases and calcium compounds. It is suitably filtered and is then fortified by the addition of further amounts of SO$_2$ from any source, such as SO$_2$ formed in a sulfur burner. The fortified liquor is then recycled to the digestion zone, if desired, after mixing with gases issuing from the digester.

In the embodiment of this process where the ash is hydrated, it is not necessary to adjust the operation of the furnace or recovery boiler to produce a highly active, or caustic, magnesia, because the magnesia is readily hydrated according to the present invention even when hardburned. Therefore, the furnace is adjusted to operate at its maximum efficiency without regard to the state of burn of the magnesia ash. This is advantageous because a higher furnace or flame temperature, or more severe burning conditions, enable rapid and complete dissociation of magnesium lignone sulfonate and burning of the carbonaceous components of the liquor. It further ensures complete breakdown of MgSO$_4$, inherently formed in this reaction, to yield magnesia and SO$_2$ at the temperatures involved. The higher flame temperatures enable reduced combustion space, also, which is of considerable economic importance. These conditions tend to convert the magnesia to periclase, and this has been considered an unsuitable form for the carrying out of the MgO-sulfur dioxide reaction to form magnesium bisulfite. According to the embodiment of the present process however, wherein the recycle ash is hydrated, the periclase, having very small crystal diameter and high specific surface, and containing only small amounts of water-insoluble impurities, is readily hydrated and then reacts with SO$_2$ at a much more rapid rate.

The use of Mg(OH)$_2$ make-up is also advantageous in comparison with the process of employing caustic magnesia because the caustic magnesia has a natural tendency to set to a gel when mixed with water, leading to difficulties in handling. The magnesium hydroxide slurry is easily pumped and conveyed, being of suitable viscosity, and it causes less wear on pumps and other equipment. Slurries of Mg(OH)$_2$ are more easily controlled in pumping and conveying systems, because the material tends to remain more uniformly in suspension. Furthermore, the conversion of Mg(OH)$_2$ to magnesium bisulfite occurs so rapidly that SO$_2$ is very readily utilized; and the reaction enables efficient operation of absorption towers in series. Less heat of reaction is observed in this conversion of magnesium hydroxide to bisulfite, with the result that a smaller cooling unit can be employed to reduce the sensible heat of the liquor coming from the absorption system.

In the specification and claims percentages are by weight unless otherwise indicated; and the analyses of the magnesia or magnesium hydroxide are expressed as though the elements were present as the respective oxides, e. g. the calcium constituent as CaO, although it may actually be present as the silicate or combined in some other form. The term "hardburn magnesia" is intended to mean a magnesia existing as periclase crystals, that is, of very low iodine number, e. g. of less than 1.0 iodine number; but the material is not in the so-called "deadburned" state, that is, it is not completely shrunken nor are the crystals coated with a water-resistant film, for instance, of silicate glasses. The magnesium compound formed by reaction of the sulfite liquor with the cellulose is variously termed herein "magnesium lignin sulfonate," "magnesium lignosulfonate" and "magnesium lignone sulfonate"; and these terms are employed synonymously.

In the above-described operation, a portion of the magnesia ash is employed (if desired, after hydration thereof) to neutralize the waste liquor from the digestion step. The amount of magnesia or Mg(OH)$_2$ required to compensate for losses in the system, that is "make-up" magnesia or Mg(OH)$_2$, can be added in the neutralization of the liquor, but preferably it is added to the magnesia slurry just prior to absorption of SO$_2$ in the absorption step. The hardburned recycle magnesia can be added in the dry state in the neutralization step and very little, if any, magnesium hydroxide is required there because the liquor is quite acid and retention time may be extended, if desired, to ensure complete reaction. However, if desired, a portion of make-up Mg(OH)$_2$ can also be added in the neutralization to partially compensate for MgO losses, and the remainder is then added to the magnesia water slurry just prior to absorption of SO$_2$. Where make-up magnesia is added, it is of course hydrated; this can be effected either alone or together with the magnesia ash, as desired.

Having now described the invention, what is claimed is:

1. In the process described for preparing cellulose pulp which includes the steps of adding magnesia to neutralize digestion liquor and of reacting a water slurry of recovered magnesia with sulfur dioxide-containing gases to form magnesium bisulfite, the improvement comprising admixing magnesium hydroxide containing on the ignited basis at least 95.0% MgO and not over 1.5% CaO with said water slurry of recovered magnesia in an amount to compensate for MgO lost in the process.

2. Process as in claim 1 wherein said magnesium hydroxide contains at least 96.0% MgO.

3. Process as in claim 1 wherein said magnesium hydroxide contains not over 1.0% CaO, on the ignited basis.

4. In the process described for preparing cellulose pulp which includes the steps of adding magnesia to neutralize digestion liquor and of reacting a water slurry of recovered magnesia with sulfur dioxide-containing gases to form magnesium bisulfite, the improvement comprising adding said magnesia and a minor portion of magnesium hydroxide to neutralize said digestion liquor, said magnesium hydroxide containing on the ignited basis at least 95.0% MgO and not over 1.5% CaO, said magnesium hydroxide being added in an amount to partially compensate for MgO lost in the process.

5. Process as in claim 4 wherein said magnesium hydroxide contains at least 96.0% MgO and not over 1.0% CaO on the ignited basis.

References Cited in the file of this patent

UNITED STATES PATENTS

| | | |
|---|---|---|
| 1,549,189 | Drewsen | Aug. 11, 1925 |
| 1,904,170 | Richter | Apr. 18, 1933 |
| 2,238,456 | Tomlinson | Apr. 15, 1941 |
| 2,285,876 | Tomlinson | June 9, 1942 |
| 2,320,294 | Palmoose et al. | May 25, 1943 |
| 2,385,955 | Tomlinson | Oct. 2, 1945 |
| 2,406,867 | Tomlinson et al. | Sept. 3, 1946 |
| 2,552,314 | Gloss | May 8, 1951 |
| 2,595,314 | Uettel et al. | May 6, 1952 |

OTHER REFERENCES

Mellor: "Treatise on Inorganic and Theoretical Chemistry," (1923), vol. 4, page 290.

Lassberg: Paper Ind. and Paper World, June 1942, page 320.

Hatch: Paper Trade J., March 14, 1946, pages 54–56.

Hatch: Pulp and Paper Mag. of Canada, December 1947, pages 85–87.